Patented June 17, 1930

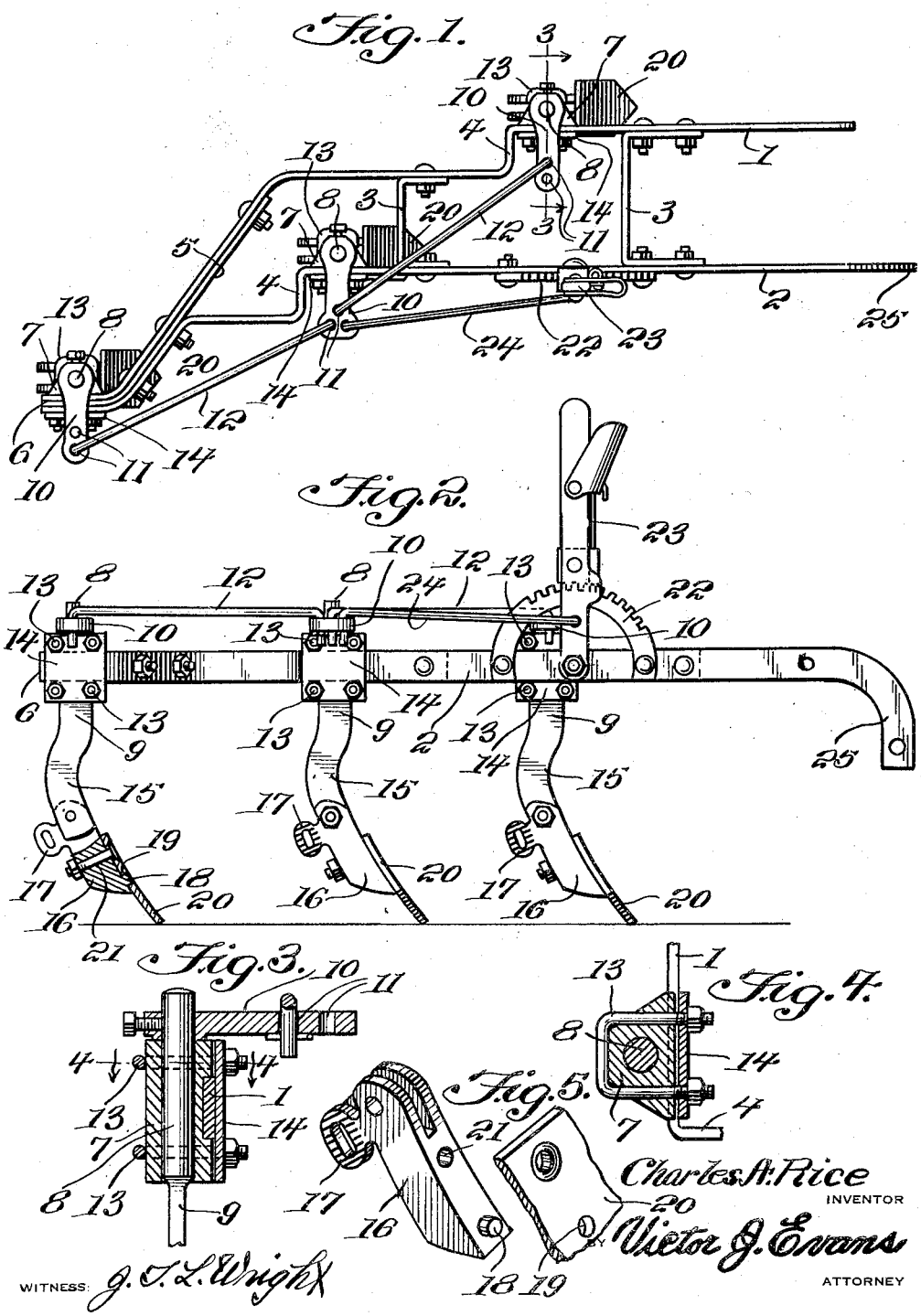

1,765,177

UNITED STATES PATENT OFFICE

CHARLES A. RICE, OF DUNNEGAN, MISSOURI

SHIFTING-SHOVEL CULTIVATOR GANG

Application filed June 6, 1928. Serial No. 283,284.

This invention relates to cultivators and its general object is to provide a cultivator shovel rig or gang, that includes means for adjusting the shovels in a horizontal plane from the driver's seat of the cultivator, so that the soil can be worked in a manner to meet existing conditions and in accordance with the growth of plants and kinds cultivated, as well as with the operator's desires.

Another object of the invention is to provide a cultivator rig of the character set forth, that is simple in construction, inexpensive to manufacture and efficient in operation and service.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:

Figure 1 is a top plan view of the device forming the subject matter of the present invention.

Figure 2 is a side elevation thereof.

Figure 3 is a sectional view taken approximately on line 3—3 of Figure 1, looking in the direction of the arrows.

Figure 4 is a sectional view taken approximately on line 4—4 of Figure 3, looking in the direction of the arrows.

Figure 5 is a detail view of the shovel foot and illustrating the manner of applying a shovel thereto.

Referring to the drawings in detail, the rig or gang includes a pair of beams 1 and 2 which are arranged in spaced relation for a portion of their length and accordingly through the medium of cross members 3. The beams are bent intermediate their ends to provide portions 4 disposed at right angles to the body of the beams, and the beams have their rear ends fixed together through the instrumentality of screw bolts. Disposed between the rear portions of the beams is a spacing strip 5 which together with the rear ends of the beams, terminate in a rearwardly extending portion 6 disposed in a line parallel with the forward portions of the beams as clearly shown in Figure 1 of the drawings.

Secured to the rearwardly extending portion 6 and to each of the beams in advance of the right angle bent portions thereof are bearing blocks 7 formed with bores to accommodate the shanks 8 of the shovel arms 9. The shanks 8 are mounted for rotation in the bores and have fixed to the upper ends by set screws, relatively flat levers 10 which have disposed in their free ends openings 11 for the purpose of accommodating the ends of links 12 whereby the shovel shanks are moved in unison as will be apparent upon inspection of Figure 1.

The bearing blocks 7 are formed with bores arranged in pairs for the purpose of receiving substantially U-shaped clamping members 13 which have their threaded ends passing through plates 14 disposed about the beams which are arranged in recesses in the bearing blocks, as best shown in Figure 3 of the drawings.

By this construction, the bearing blocks are securely fixed to the beams and can be adjusted thereon if desired.

The shovel arms are curved upon themselves as at 15 and terminate in apertured lower ends for receiving bolt and nut connections for the purpose of securing shovel feet 16 thereto. The shovel feet have formed with their rear faces apertured ears 17 to accommodate the usual spring operated tripping means not shown and extending from the front faces of the feet adjacent the lower ends thereof are studs 18 adapted to be received in openings 19 formed in the shovels 20 as suggested in Figure 5 of the drawings. The shovels 20 are also provided with openings which are aligned with bores 21 formed in the feet when the studs 18 are disposed in the openings 19. These openings and bores are adapted to receive bolt and nut connections as best shown in Figure 2 of the drawings.

Secured to the beam 2 is a toothed segment 22 which cooperates with hand operated means secured to the operating lever 23 for moving the shovels through the medium of the links 12 and a link 24 which has its ends secured to the centrally disposed lever 10 and the operating lever 23, as clearly shown in Figure 1 of the drawings.

The forward end of the beam 2 is bent downwardly and disposed in vertical position. This downwardly bent portion which is indicated by the reference numeral 25 is provided with an opening whereby the rig may be fixed to the pulling hitch of the cultivator while openings are formed in the forward portions of the beams 1 and 2 for securing the rig to the cultivator frame, and by disposing the hitching means in this manner, it will reduce the draft to a minimum.

From the above description and disclosure of the drawings it will be obvious that I have provided a cultivator rig or gang that includes movable shovels mounted for movement in a horizontal plane and operated simultaneously from the driver's seat of the cultivator whereby the shovels may be moved in accordance with the desires of the operator, the growth of the crop and the conditions of the soil.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:

A cultivator rig comprising a pair of spaced beams, bearing blocks mounted on the beams and spaced in stepped relation longitudinally thereof, cultivator shovels including shafts journaled in said blocks, flat levers connected with the upper ends of said shanks and projecting therefrom in a common direction toward one side of the rig, each lever having a plurality of openings adjacent the free end thereof, a pair of rods having downturned extremities received by adjacent openings of the respective levers, with the rods arranged in end to end relation and connecting all of said levers, a manually operable lever pivoted on one of said beams, and having an opening adjacent one end thereof, and an additional rod having offset extremities received by said opening and an opening in the intermediate lever, whereby all of said levers and cultivator shoes are simultaneously adjusted incident to the movement of the hand operated lever.

In testimony whereof I affix my signature.

CHARLES A. RICE.